(12) United States Patent
Sengodan (10) Patent No.: US 11,142,075 B2
(45) Date of Patent: Oct. 12, 2021

(54) EFFICIENT REGENERATIVE ELECTRICAL BRAKING

(71) Applicant: Hamilton Sundstrand Corporation, Charlotte, NC (US)

(72) Inventor: Rajkumar Sengodan, Tamilnadu (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 30 days.

(21) Appl. No.: 16/594,153

(22) Filed: Oct. 7, 2019

(65) Prior Publication Data

US 2021/0039499 A1 Feb. 11, 2021

(30) Foreign Application Priority Data

Aug. 8, 2019 (IN) .............................. 201911032211

(51) Int. Cl.
| | |
|---|---|
| *H02P 1/00* | (2006.01) |
| *H02P 3/00* | (2006.01) |
| *H02P 3/20* | (2006.01) |
| *B60L 7/12* | (2006.01) |
| *B60L 3/00* | (2019.01) |
| *B60L 7/00* | (2006.01) |
| *B60L 7/22* | (2006.01) |

(52) U.S. Cl.
CPC .............. *B60L 7/12* (2013.01); *B60L 3/0061* (2013.01); *B60L 3/0076* (2013.01); *B60L 7/003* (2013.01); *B60L 7/22* (2013.01); *B60L 2220/20* (2013.01)

(58) Field of Classification Search
CPC ................................. B60L 7/12; B60L 3/0061
USPC ....................................................... 318/273
See application file for complete search history.

(56) References Cited

U.S. PATENT DOCUMENTS

| | | | |
|---|---|---|---|
| 5,332,954 | A | 7/1994 | Lankin |
| 6,686,719 | B2 | 2/2004 | Cochoy et al. |
| 6,943,510 | B2 | 9/2005 | Gorti |
| 7,880,337 | B2 | 2/2011 | Farkas |
| 9,035,583 | B2 | 5/2015 | Cerrato et al. |
| 9,035,584 | B2 | 5/2015 | Cameron |
| 9,428,069 | B2 | 8/2016 | Powell et al. |
| 9,722,514 | B2 | 8/2017 | Chmielewski |
| 9,960,687 | B2 | 5/2018 | Elasser et al. |
| 2007/0170910 | A1 | 7/2007 | Chang et al. |

(Continued)

FOREIGN PATENT DOCUMENTS

| | | |
|---|---|---|
| EP | 1650860 A1 | 4/2006 |
| GB | 1435316 A | 5/1976 |

(Continued)

OTHER PUBLICATIONS

Extended European Search Report; dated Feb. 5, 2021; European Application No. 20189441.7; Filed: Aug. 4, 2020; 7 pages.

*Primary Examiner* — Erick D Glass
(74) *Attorney, Agent, or Firm* — Cantor Colburn LLP (57) ABSTRACT

Provided are embodiments for a braking system, where the system includes a controller, a motor coupled to an H-bridge network, a DC link coupled to the motor, and an electrical braking system electrically coupled to the motor. The electrical braking system includes a sense circuit configured to sense a condition of the DC link, a brake resistor coupled to the DC link, a drive circuit coupled to the sense circuit, and a transformer for regeneration. Also, provided are embodiments of a method for operating an efficient regenerative resonance electrical braking system.

17 Claims, 5 Drawing Sheets

(56) References Cited

U.S. PATENT DOCUMENTS

2014/0300298 A1\* 10/2014 Liu .......................... H02P 3/22
                                                              318/380
2015/0171674 A1    6/2015 Lee et al.
2019/0319529 A1\* 10/2019 Yamano .............. H02M 5/4585
2020/0332791 A1\* 10/2020 Arefeen ................ F04B 47/022

FOREIGN PATENT DOCUMENTS

| GB | 2459883 A | 11/2009 |
|----|-----------|---------|
| IN | 201744019730 A | 12/2017 |
| JP | 2014138532 A | 7/2014 |
| KR | 2009118712 A | 11/2009 |
| WO | 2014031112 A1 | 2/2014 |
| WO | 2019053270 A2 | 3/2019 |
| WO | 2019053675 A2 | 3/2019 |

\* cited by examiner

EFFICIENT REGENERATIVE ELECTRICAL BRAKING

CROSS-REFERENCE TO RELATED APPLICATIONS

This application claims the benefit of Indian Application No. 201911032211 filed Aug. 8, 2019, which is incorporated herein by reference in its entirety.

BACKGROUND

The present invention generally relates to electrical systems, and more specifically to a system and method for operating an efficient regenerative resonance electrical braking system.

The principal of regenerative braking is utilized to capture, like electrical energy, much of the energy otherwise lost to heat during braking. The kinetic energy converted to electrical energy during regenerative braking is utilized to charge, or re-charge, a suitable device in an electrical energy storage system. Correspondingly, that electrical energy storage system is then able to supply a portion of the electrical energy required to power the traction motor(s) during periods of vehicle acceleration and/or maintenance of constant velocity.

BRIEF DESCRIPTION

According to an embodiment, a method for operating the braking is provided. The method includes operating an electrical braking system in at least one mode; sensing a condition of the electrical braking system; and performing braking based at least in part on the at least one mode and the sensed condition.

In addition to one or more of the features described herein, or as an alternative, further embodiments include operating the electrical braking system in a pulsed mode, wherein when in the pulsed mode a switch that is parallel with a brake resistor is switched OFF; and controlling a first brake drive switch based on a configurable duty cycle.

In addition to one or more of the features described herein, or as an alternative, further embodiments include operating the electrical braking system in a resonance regenerative mode, wherein when in the resonance regenerative mode a switch that is parallel to the brake resistor is switched ON; and controlling a first brake drive switch and a second brake drive switch in a sequential fashion which allows current to flow to a transformer for regeneration.

In addition to one or more of the features described herein, or as an alternative, further embodiments include storing the energy during the resonance regenerative mode.

In addition to one or more of the features described herein, or as an alternative, further embodiments include providing energy to an auxiliary system.

In addition to one or more of the features described herein, or as an alternative, further embodiments include operating the electrical brake system in a combination pulsed braking and resonance regenerative mode; switching a switch that is parallel to the brake resistor OFF; and switching a first brake drive switch according to a configurable duty cycle to allow for pulsed braking and resonance regeneration.

In addition to one or more of the features described herein, or as an alternative, further embodiments include using a sensed condition, wherein the sensed condition is a DC link voltage.

In addition to one or more of the features described herein, or as an alternative, further embodiments include using a sensed condition, wherein the sensed condition exceeds a DC link upper threshold voltage.

In addition to one or more of the features described herein, or as an alternative, further embodiments include implementing switching that is controlled by pulse width modulation (PWM) signal.

In addition to one or more of the features described herein, or as an alternative, further embodiments include coupling a transform to each phase of a motor; and performing braking for each phase based at least in part on the at least one mode and the sensed condition.

According to another embodiment, a system for is provided for performing efficient regenerative resonance electrical braking is provided. The system includes a controller; a motor coupled to an H-bridge network; a DC link coupled to the motor; and an electrical braking system electrically coupled to the motor. The electrical braking system includes a sense circuit configured to sense a condition of the DC link; a brake resistor coupled to the DC link; a drive circuit coupled to the sense circuit; and a transformer for regeneration.

In addition to one or more of the features described herein, or as an alternative, further embodiments include an electrical braking system that is configured to operate in a pulsed mode, wherein when in the pulsed mode a switch that is parallel with the brake resistor is switched OFF, and is configured to control a first brake drive switch based on a configurable duty cycle.

In addition to one or more of the features described herein, or as an alternative, further embodiments include the electrical braking system is configured to operate in a resonance regenerative mode, wherein when in the resonance regenerative mode a switch that is parallel to the brake resistor is switched ON, and is configured to control a first brake drive switch and a second brake drive switch in a sequential fashion which allows current to flow to the transformer for regeneration.

In addition to one or more of the features described herein, or as an alternative, further embodiments include an electrical braking system that is configured to operate in a combination pulsed braking and resonance regenerative mode, switch a switch parallel to the brake resistor OFF, and switch a first brake drive switch according to a configurable duty cycle to allow for pulsed braking and resonance regeneration.

In addition to one or more of the features described herein, or as an alternative, further embodiments include using a sensed condition, wherein the sensed condition is a DC link voltage.

In addition to one or more of the features described herein, or as an alternative, further embodiments include using a sensed condition, wherein the sensed condition exceeds a DC link upper threshold voltage.

In addition to one or more of the features described herein, or as an alternative, further embodiments include a controller that is configured to provide control signals including pulse width modulation (PWM) signal.

In addition to one or more of the features described herein, or as an alternative, further embodiments include a sense circuit that includes a Zener diode configuration.

In addition to one or more of the features described herein, or as an alternative, further embodiments include an electrical braking system that is configured in a star connected configuration.

In addition to one or more of the features described herein, or as an alternative, further embodiments include a star connected configuration where a transformer is coupled to each phase of the motor, wherein each transformer performs braking for each phase based at least in part on at least one of a mode and the sensed condition.

Technical effects of embodiments of the present disclosure include efficiently transforming motor braking torque to regenerative action to store energy and/or power-up auxiliary circuits. A motor driving apparatus includes a DC link capacitor, H-bridge switches configuration for driving the motor, PWM circuit for each IGBT drive, brake drive, and transformer for regeneration. A switchable configuration short form of connection to generate electrical braking by deploying a brake resistor and LC network to the motor coil.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

The braking of a motor in an electric drive is typically accomplished by closing brake contacts across the motor windings after the trigger of the switch that couples power to the motor windings is opened. This conventional technique results in very high currents during braking with increased size of brake resistors and power dissipated as heat with no regeneration. Further, it results in sudden braking, which can be detrimental to the life of the motor system.

The techniques described herein are capable of minimizing the size of the brake resistor and power dissipation in the brake resistor during the braking operation. In addition, the responsiveness, power generation, and control performance is improved by executing the braking operations using pulse braking mode and resonance regenerative braking mode. The braking circuit is fed with back EMF generated by the motor when power is disconnected from the motor.

According to aerospace power quality specifications, the regenerative power must be dissipated in the drive itself to avoid instability problem in the aircraft power supply. The regenerative braking system drives a motor by using the kinetic energy and charges a battery/DC link capacitor with electric energy generated from the motor in order to improve the efficiency of the electric drive, so that the regenerative braking system improves the fuel consumption ratio. In order to maximize the charge rate of a battery by converting kinetic energy into electric energy through the regenerative braking of the motor during the braking operation, an active-control braking device capable of reducing braking force corresponding to the regenerative braking torque is necessary.

Conventional techniques dissipate the back EMF as heat in the brake resistor. The techniques described herein will transform the dissipated power to regenerative power which in turn reduces the multifold the size of the braking resistor increase the efficiency of the system.

In accordance with one or more embodiments, when operating in the pulse braking mode, the brake resistor is turned ON for a longer duration when compared to operating in the regenerative mode. In one or more embodiments, the duty cycle for one or more switching transistors is configured to allow for faster braking. Therefore, the brake resistor will engage motor brake fast enough to stop the mechanical movement. The duty cycle can be configured according to the desired braking method. The pulse braking method aids in stopping further rotor movement.

During resonance regenerative braking mode according to the embodiments described herein, the switching transistors are turned ON in a sequential fashion. This mode provides regenerative power from the excess back EMF generated above the DC LINK upper threshold voltage. This energy can be utilized for driving auxiliary loads in the system. In another example, the energy can be stored in an energy storage device such as a battery. The techniques described herein also provide for operating the electrical braking system in a combined mode including the resonance regenerative braking and pulse braking mode.

Figure 1:
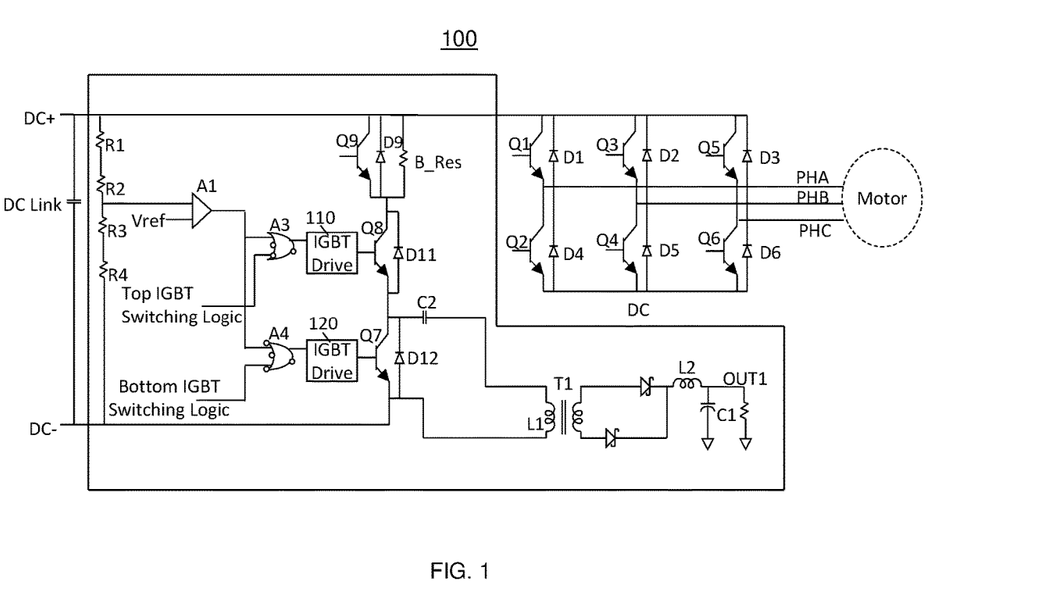
FIG. 1 depicts an arrangement of the electrical braking system using top/bottom brake IGBT in accordance with one or more embodiments.

FIG. 1 depicts a circuit for resonance electrical braking system 100 in accordance with one or more embodiments. FIG. 1 depicts a motor and an H-bridge circuit including switches Q1, Q2, Q3, Q4, Q5, Q6, and diodes D1, D2, D3, D4, D5, D6. In one or more embodiments, the motor is a brushless DC motor. In other embodiments a brushed motor can be used. It should be understood the techniques described herein can also be applied to alternating current (AC) motors as well. The diodes D1-D6 are connected across the corresponding switches Q1-Q6. Also, the H-bridge circuit is coupled to a switching logic (not shown) to control the output of the H-bridge circuit. In addition, FIG. 1 depicts a comparator A1, logic devices (OR gates) A3, A4, a brake resistor B_Res connected in parallel with the switch Q9 and the diode D9. Also shown in FIG. 1 are brake switches Q7, Q8 with corresponding diodes D12, D11 arranged across the brake switches Q7, Q8. The brake switches Q7, Q8 are controlled by the brake drives 110, 120. The transformer T1 is coupled across the brake switch Q7 and is configured to perform the regeneration process during braking.

In a non-limiting example, during nominal operating conditions the DC link can hold-up to 270 Vdc to operate the load drive. Under braking conditions, the back EMF generated by the motor charges the DC link capacitor to the upper threshold voltage. In one embodiment, the upper threshold is 380 V. It should be understood the upper threshold can be selected based on a particular application. Once the DC link capacitor charge exceeds the upper threshold the brake resistor B_Res is turned ON to dissipate the excess energy as heat. That is, the switch Q9 is switch OFF to allow the brake resistor to dissipate the excess energy. The upper voltage threshold sense circuit includes a series of thick film resistors R1, R2, R3, R4 that provide the sensed DC link voltage to the non-inverting terminal of the comparator A1.

The inverting terminal of the comparator A1 is provided with a reference voltage (Vref) which is used to compare the sensed voltage to determine whether an upper threshold has been exceeded. Logic devices A3, A4 (OR gates) are coupled to the comparator and receive input from the comparator A1 and switching logic (not shown). The output of the logic devices A3, A4 are provided to the brake drives 110, 120 to control the switches Q7, Q8, respectively. In one embodiment, the logic devices A3, A4 trigger the brake drives 110, 120 when it receives logic HIGH signal. It is to be noted that the comparator A1 will overdrive the brake drives 110, 120 if the DC link voltage reaches the upper threshold value during back EMF generation and comparator A1 is implemented for the DC link protection function.

When the system 100 operates in the pulse braking mode, the brake resistor B_Res is turned ON for a longer duration when compared to the regenerative mode. In a non-limiting example, the duty cycle for the switch Q7 is configured with a ton (switch/transistor ON duty cycle) >50%, switch Q8 is ON and switch Q9 is in the OFF state. Therefore, the brake resistor (B_Res) will engage the motor brake fast enough to stop the mechanical movement. The duty cycle can be configured as per the braking method. For example, the ton=100% or ton=80% and toff=20%. During a permanent motor stall, the pulse braking method aids in stopping the rotor movement of the braking system. During the pulse braking mode, the regeneration voltage is considerably less than when operating in the resonance regenerative braking mode described below.

When operating in the resonance regenerative braking mode, the operation can be carried out with the resonance regenerative braking by turning ON switches Q8 and Q7 sequentially. That is, switches Q8, Q7 are switched 180 degrees out of phase (ton and toff duty cycle can be varied for the desired braking response). The switch Q9 is turned ON to provide lossless power in the brake resistor B_Res for efficient regenerative braking.

If the switch Q8 is configured with a duty cycle=50% and the switch Q7 is configured with a duty cycle=50%, where each switch operates 180 degrees out-of-phase with each other the switches are effectively operated sequentially and provides a current to the transformer T1. The brake resistor B_Res is in series with LC which limits the amount of current flowing to the LC circuit of the transformer T1. For fast braking, turning ON switch Q7 during the conduction state of switch Q8 enables sequential resistive braking (i.e., switch Q8 duty cycle=50% and the switch Q7 duty cycle=70%). It should be understood that this is not intended to limit the scope and the duty cycles for the switches Q7, Q8 can be modified to provide faster braking or slower braking based on the desired application.

In the combination mode where the system 100 operates in both the resonance regenerative braking mode and the pulse braking mode, the switch Q7 is configured to switch with a duty cycle set to ton=50% and toff=50%, the switch Q8 is ON and the switch Q9 is OFF. With the switch Q9 switched OFF, the current is allowed to flow through the braking resistor B_Res. It should be understood the ton and toff duty cycle can be varied for the desired braking response. The LC series resonance of the transformer T1 is limited to the maximum current capability and in such case the resistive braking is deployed sequentially to the LC circuit for efficient braking within a short duration. The brake resistor B_Res is in series with LC circuit of the transformer T1 which limits the amount of current flow in the LC circuit. During the ton duty cycle for switch Q7 the pulse braking mode is activated and during the toff cycle the brake energy will flow through the LC network (L1, C2) of the transformer T1.

The resonance regenerative braking mode will engage the motor brake dynamically (i.e., resonance regenerative braking and resistive pulse braking) to stop the mechanical movement. This action provides regenerative power from the excess back EMF generated above the DC link upper threshold voltage. This energy can be utilized for driving auxiliary load in the system or stored in a storage device for future use.

Figure 2:
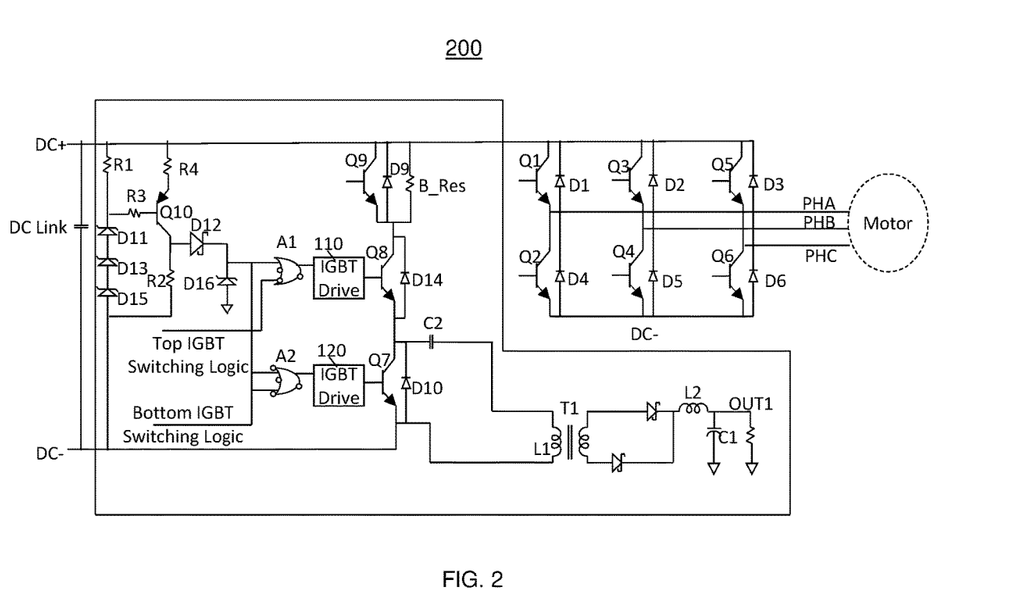
FIG. 2 depicts a different arrangement of the electrical braking system using a Zener upper threshold detection circuit in accordance with one or more embodiments.

Now referring to FIG. 2 an alternative arrangement for an electrical braking system 200 in accordance with one or more embodiments is shown. The system 200 includes similar components as that shown in FIG. 1 including the motor, H-bridge circuit having switches Q1-Q6 and diodes D1-D6, the DC link, brake resistor B_Res, switch Q9, brake drives 110, 120 and switches Q7, Q8, and transformer T1.

In addition, the system 200 includes the resistors R1, R2, R3, R4 which provide a bias to switch Q10 (e.g., PNP transistor) and the Zener diodes D11, D13, D15 are configured to turn ON once the back EMF voltage goes above an upper threshold, i.e., 380 V. The resistor R1 limits the current for Zener diode conduction. The switch Q8 will turn ON once Zener breakdown occurs, and the voltage across the resistor R2 provides a logic HIGH to logic devices A1, A2. The diode D16 protects the logic devices A1, A2 from over-voltage during operation. It should be understood that the system 200 can operate in the modes including the pulsed braking mode, the resonance regenerative mode, and the combination mode as described with reference to FIG. 1.

Figure 3:
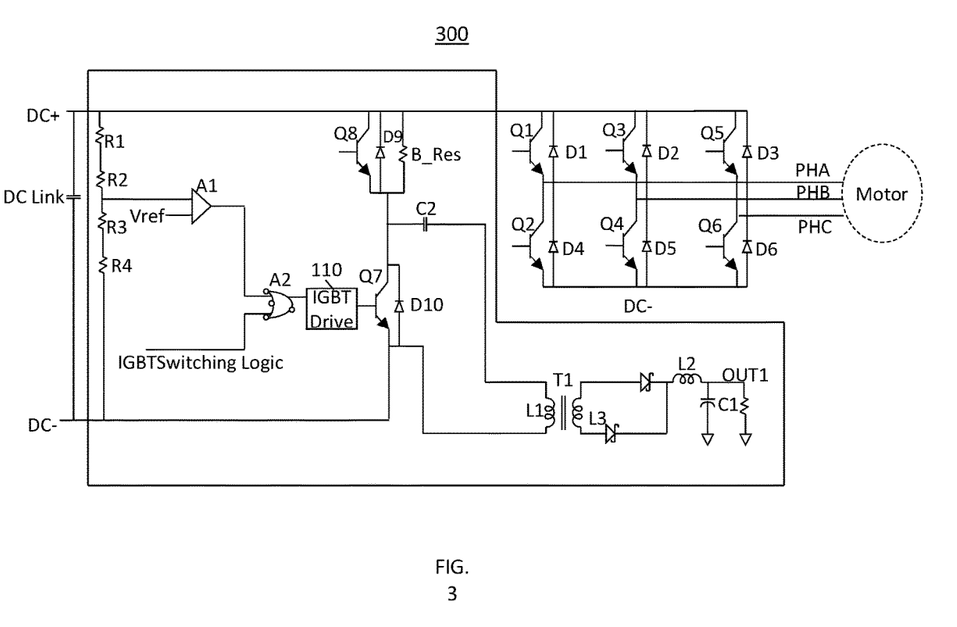
FIG. 3 depicts another arrangement of the electrical braking system with a single brake IGBT in accordance with one or more embodiments.

FIG. 3 depicts another arrangement for an electrical braking system 300 in accordance with one or more embodiments. The system 300 includes similar components as that shown in FIG. 1 including the motor, H-bridge circuit having switches Q1-Q6 and diodes D1-D6, the DC link, brake resistor B_Res, switch Q9, brake drive 110 and switch Q7, and transformer T1. In the system 300, the upper voltage threshold sense circuit includes a series of resistors R1, R2, R3, R4 and provides the DC link voltage sense signal to the non-inverting terminal of the comparator A1 for the brake drive 110. The logic device A2 will trigger the brake drive 110 when it receives a logic HIGH signal. It is to be noted that the comparator A1 will overdrive the brake drive 110 in the event the DC link voltage reaches the worst case value during the back EMF generation. The comparator A1 is implemented for the DC link protection function.

It should be understood that the system 200 can operate in the modes including the pulsed braking mode, the resonance regenerative braking mode, and the combination mode as described with reference to FIG. 1. In the pulsed braking mode, the switch Q8 is switched OFF allowing the current to flow through brake resistor B_Res and the braking is controlled by the duty cycle ton for Q7 is set to ton >50%. When operating in the resonance regenerative braking mode, the switch Q8 is switched ON and the duty cycle for switch Q7 can be set to ton=50% to provide the current to the transformer T1 to perform the regeneration. Finally, when operating in the combined mode, the switch Q8 is switched OFF and the duty cycle ton for switch Q7 can be set to allow for a sufficient amount of current to flow to the transformer to perform regeneration.

Figure 4:
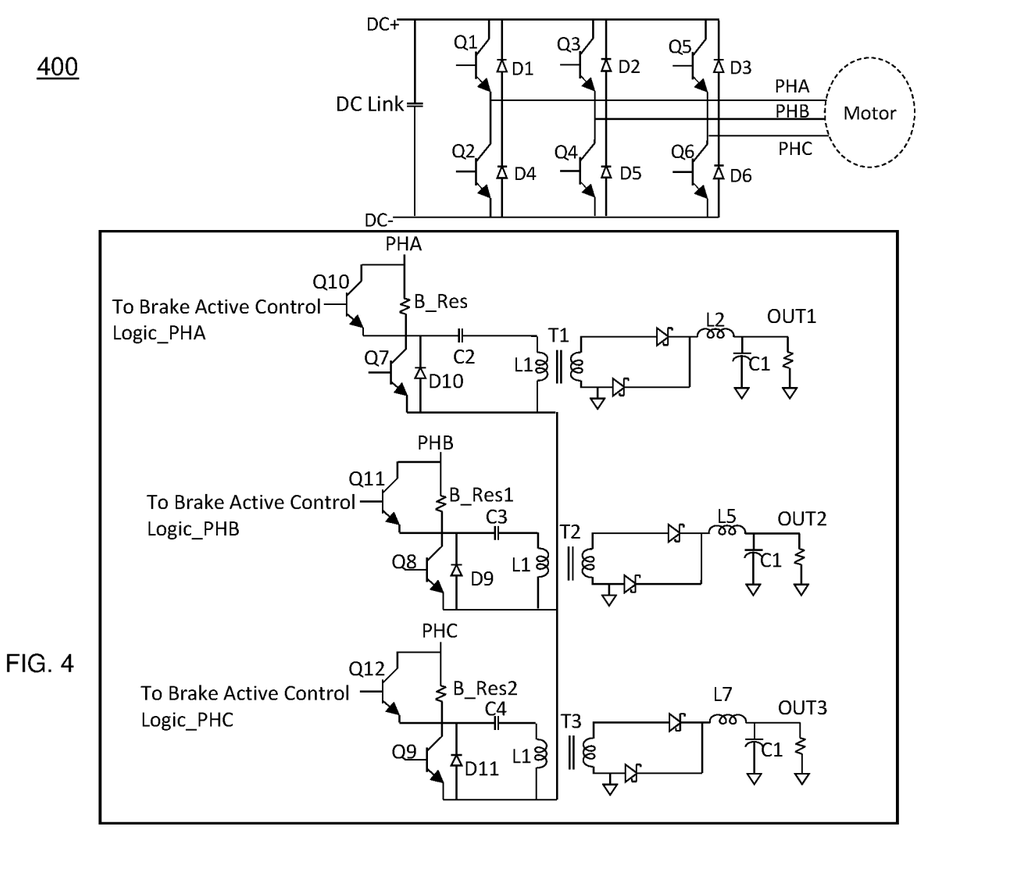
FIG. 4 depicts an arrangement for electrical braking system with star connected brake drives in accordance with one or more embodiments.

FIG. 4 depicts an arrangement for an electrical braking system 400 with a star connected brake drive in accordance with one or more embodiments. The system 400 includes a motor, DC link, and an H-bridge circuit having switches Q1-Q6 and diodes D1-D6. The system 400 also includes brake drive switches Q7, Q8, Q9, brake resistors B_Res, B_Res1, B_Res2, and transformers T1, T2, T3 for each respective phase of the motor, respectively. Alternatively, a flyback topology can be utilized for T1, T2, T3 (not shown). This regenerative type configuration provides individual phase control and pulsed brake loading/regenerative brake loading during back EMF action. It should be understood that the system 400 can operate in the modes including the pulsed braking mode, the resonance regenerative braking mode, and the combination mode as described with reference to FIG. 1. In an example, during a pulsed mode the switch Q10 can be switched OFF allowing current to flow through the braking resistor B_Res to dissipate the heat and the duty cycle for switch Q7 is set to ton >50%. When operating in a resonance regenerative mode, the switch Q10 is switched ON and the switch Q7 is set to a duty cycle of ton=50% to allow the transformer T1 to perform the regeneration process. When operating in the combined mode, the switch Q10 is switched OFF and the duty cycle ton for switch Q7 can be set to allow for a sufficient amount of current to flow to the transformer T1 to perform regeneration.

Figure 5:
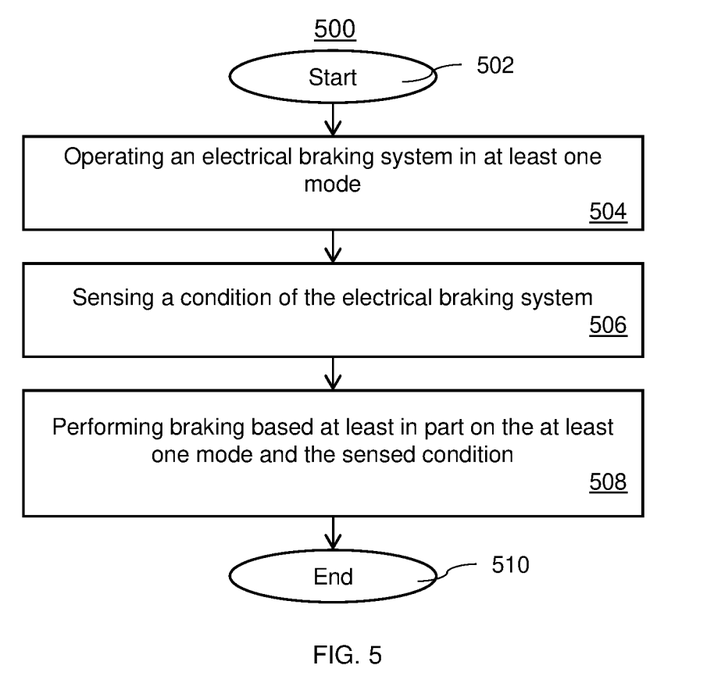
FIG. 5 depicts a method for operating the electrical braking system in accordance with one or more embodiments.

Now referring to FIG. 5, the flowchart of a method 500 for operating an electrical braking system in accordance with one or more embodiments is shown. The method 500 can be implemented in any of the braking systems 100, 200, 300, 400. It should be understood that other configuration can be used to implement the method 500. The method 500 begins at block 502 and proceeds to block 504 which operates an electrical braking system in at least one mode. The modes can include the pulsed braking mode, the resonance regenerative braking mode, a combination of the pulsed braking and resonance regenerative braking mode, and others.

Block 506 senses a condition of the electrical braking system. In some embodiments, the condition that is monitored is a threshold voltage of the DC link. In one configuration, a comparator receives an input and compares the input to a reference signal to determine whether the threshold has been exceeded. Subsequently, the output of the comparator can be provided to logic devices to control the drive. It should be understood that other conditions can be monitored.

At block 508, braking is performed based at least in part on the at least one mode and the sensed condition. In the event the upper threshold voltage of the DC link is reached and/or exceeded, the electrical braking system functions in the configured mode. The method 500 ends at block 510. It should be understood that the steps in FIG. 5 are not intended to limit the scope and additional/different steps can be included in the method 500.

The technical benefits and effects include implementing pulsed braking resistors and regenerative resonance braking which improves the efficiency of the electric drive. In addition, the regenerative action can be configured in buck/boost mode for auxiliary load drive. The technical benefits and effects also include a sequenced independent control of pulse braking and resonance braking mode with controlled duty cycle. Due to resonance braking, a smaller size brake resistor is sufficient compared to existing braking topologies.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method comprising,
operating an electrical braking system in at least one mode;
sensing a condition of the electrical braking system;
performing braking based at least in part on the at least one mode and the sensed condition;
coupling a transform to each phase of a motor; and
performing braking for each phase based at least in part on the at least one mode and the sensed condition.

2. The method of claim 1, further comprising operating the electrical braking system in a pulsed mode, wherein when in the pulsed mode a switch that is parallel with a brake resistor is switched OFF; and
controlling a first brake drive switch based on a configurable duty cycle.

3. The method of claim 1, further comprising operating the electrical braking system in a resonance regenerative mode, wherein when in the resonance regenerative mode a switch parallel to the brake resistor is switched ON; and
controlling a first brake drive switch and a second brake drive switch in a sequential fashion which allows current to flow to a transformer for regeneration.

4. The method of claim 3, further comprising storing the energy during the resonance regenerative mode.

5. The method of claim 3, further comprising providing energy to an auxiliary system.

6. The method of claim 1, further comprising operating the electrical brake system in a combination pulsed braking and resonance regenerative mode;
switching a switch parallel to the brake resistor OFF; and
switching a first brake drive switch according to a configurable duty cycle to allow for pulsed braking and resonance regeneration.

7. The method of claim 1, wherein the sensed condition is a DC link voltage.

8. The method of claim 1, wherein the sensed condition exceeds a DC link upper threshold voltage.

9. The method of claim 2, wherein switching is controlled by pulse width modulation (PWM) signal.

10. A system comprising:
a controller;
a motor coupled to an H-bridge network;
a DC link coupled to the motor; and
an electrical braking system electrically coupled to the motor, the electrical braking system comprising:
a sense circuit configured to sense a condition of the DC link;
a brake resistor coupled to the DC link;
a drive circuit coupled to the sense circuit; and
a transformer for regeneration;

wherein the electrical braking system is configured in a star connected configuration, wherein the star connected configuration comprises a transformer coupled to each phase of the motor, wherein each transformer performs braking for each phase based at least in part on at least one of a mode and the sensed condition.

11. The system of claim 10, wherein the electrical braking system is configured to operate in a pulsed mode, wherein when in the pulsed mode a switch that is parallel with the brake resistor is switched OFF; and control a first brake drive switch based on a configurable duty cycle.

12. The system of claim 10, wherein the electrical braking system is configured to operate in a resonance regenerative mode, wherein when in the resonance regenerative mode a switch that is parallel to the brake resistor is switched ON; and control a first brake drive switch and a second brake drive switch in a sequential fashion which allows current to flow to the transformer for regeneration.

13. The system of claim 10, wherein the electrical braking system is configured to operate in a combination pulsed braking and resonance regenerative mode;

switch a switch parallel to the brake resistor OFF; and switch a first brake drive switch according to a configurable duty cycle to allow for pulsed braking and resonance regeneration.

14. The system of claim 10, wherein the sensed condition is a DC link voltage.

15. The system of claim 10, wherein the sensed condition exceeds a DC link upper threshold voltage.

16. The system of claim 10, wherein the controller is configured to provide control signals including pulse width modulation (PWM) signal.

17. The system of claim 10, wherein the sense circuit comprises a Zener diode configuration.

* * * * *